Figure 1:
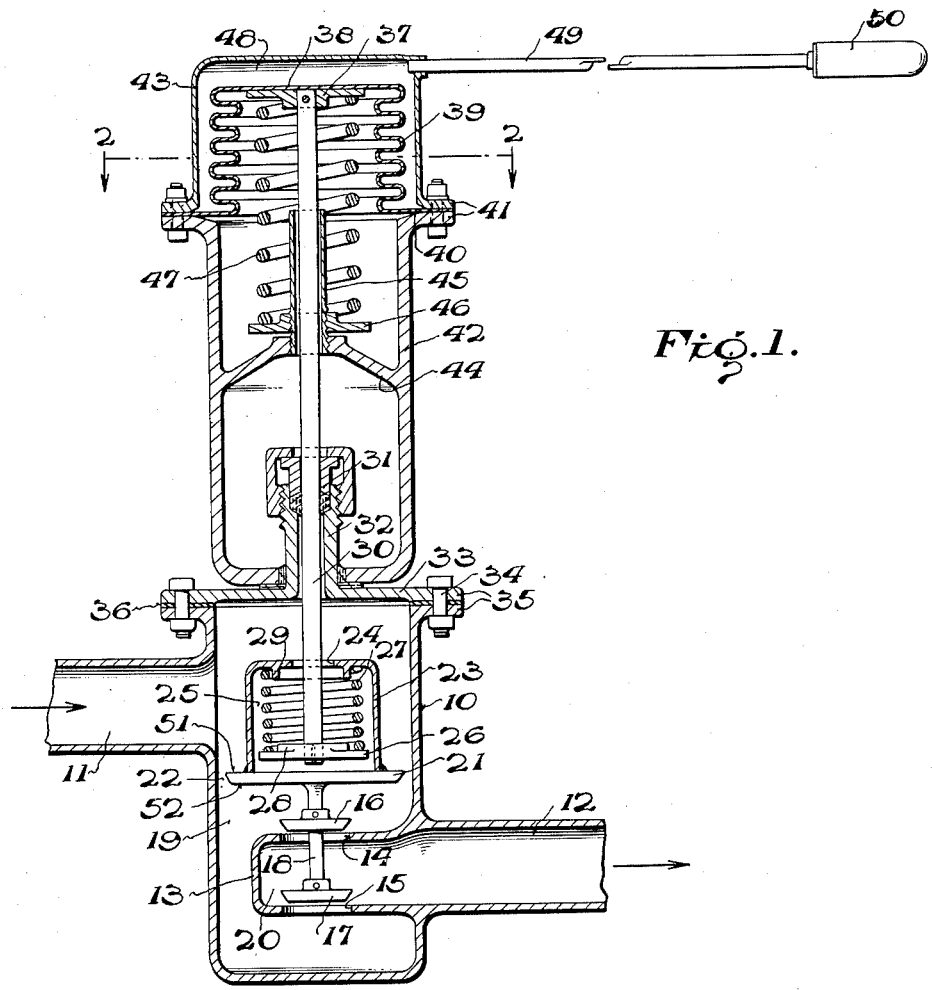

March 4, 1952 C. D. BRANSON 2,587,815
CONSTANT FLOW VALVE MECHANISM
Filed July 22, 1948

INVENTOR.
Charles D. Branson,
BY
Cameron, Kerkam + Sutton
Attorneys

Patented Mar. 4, 1952

2,587,815

UNITED STATES PATENT OFFICE 2,587,815

CONSTANT FLOW VALVE MECHANISM

Charles D. Branson, Knoxville, Tenn., assignor to Robertshaw-Fulton Controls Company, Knoxville, Tenn., a corporation of Delaware Application July 22, 1948, Serial No. 40,042

5 Claims. (Cl. 236—99)

This invention relates to constant flow valves and particularly to such valves capable of thermostatic operation.

It has heretofore been proposed to seek a constant flow of fluid, notwithstanding variations in the supply pressure, by introducing an orifice as a restriction in a conduit through which the fluid is flowing and subjecting to the pressure existing at the inlet side of said orifice a spring actuated diaphragm operatively connected to an inlet valve, to the end that variations in the supply pressure, reflected as variations of pressure at the inlet side of the orifice, will operate the diaphragm and the valve connected thereto to adjust the inflow of fluid and maintain a substantially constant pressure at the inlet side of said orifice, the rate of flow being then determined by the pressure drop across said orifice. While devices of this character may be constructed so as to be sensitive to variations in the inflow pressure, they fail to maintain a constant flow if there are variations of pressure in the outflow line because a change in back pressure will alter the rate of flow due to the maintenance of the predetermined pressure at the inlet side of said orifice.

It is an object of this invention to provide an improved constant flow valve wherein the rate of flow is maintained constant notwithstanding fluctuations in the outflow pressure as well as in the inflow pressure.

Another object of this invention is to provide an improved constant flow valve which may be thermostatically operated to vary the volume of flow with changes of temperature while maintaining a constant flow at any given temperature.

Another object of this invention is to provide an improved constant flow valve as last characterized which maintains a constant rate of fluid flow notwithstanding variations in the outlet pressure or the inlet pressure or both.

Another object of this invention is to provide an improved constant flow valve which is highly efficient in operation.

Another object of this invention is to provide an improved constant flow valve which is particularly simple in construction so that it may be fabricated at relatively low cost.

Other objects will appear as the description of the invention proceeds.

The invention is capable of receiving a variety of mechanical expressions only one of which is shown on the accompanying drawing, and therefore it is to be expressly understood that the drawing is for purposes of illustration only, and is not to be construed as a definition of the limits of the invention, reference being had to the appended claims for that purpose.

Figure 2:
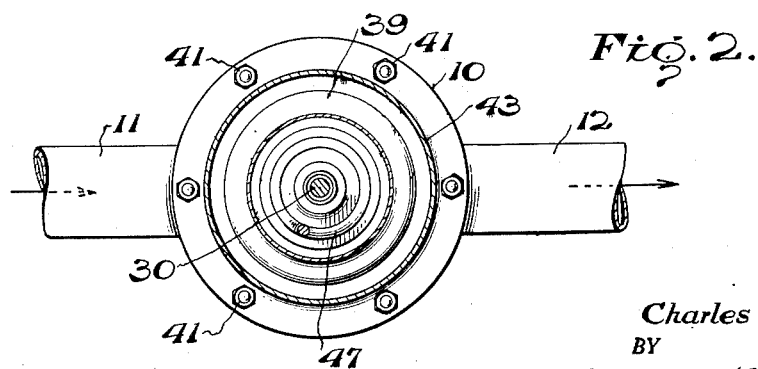

The invention is illustrated somewhat diagrammatically in the accompanying drawing wherein Fig. 1 is a vertical section of an embodiment of the invention; and Fig. 2 is a cross section on the line 2—2 of Fig. 1.

In the form shown, 10 designates a valve housing of any suitable size, construction and material provided with an inlet conduit 11 and an outlet conduit 12 formed integrally therewith or suitably attached thereto. Interiorly of the housing 10 a partition 13 is provided in any suitable way to subdivide the space within said housing into inlet and outlet chambers 19 and 20 respectively, said partition having a pair of aligned valve ports 14 and 15 of equal area. Disposed for cooperative relationship with said ports 14 and 15 is a pair of valve members 16 and 17 of equal effective area and mounted in any suitable way on a valve stem 18. As said valve members 16 and 17 are subjected at their opposite faces to the pressures in the inlet chamber 19 and outlet chamber 20, and as said valve members are of equal effective area, a balanced valve mechanism is thereby provided.

A disk 21, formed integrally with the valve stem 18 or secured thereto in any suitable way, is disposed in the inlet chamber 19 and is of such size as to form a predetermined clearance 22 between the periphery of the disk 21 and the inner wall of the housing 10, so that said clearance constitutes an orifice of predetermined area. Mounted on said disk 21 and secured thereto in any suitable way is an inverted cup-shaped member 23 having an aperture 24 in its bottom wall. Disposed within the chamber 25 in said cup-shaped member is an abutment plate 26 between which and the bottom wall of said cup-shaped member 23 is disposed a coil spring 27 of predetermined tension. Any suitable means may be used for centering spring 27 within the chamber 25, plate 26 being shown as provided with a central centering elevation 28, and the bottom wall of cup-shaped member 23 being shown as provided with a centering rib 29.

In the preferred embodiment of the present invention abutment plate 26 is adjustable, preferably thermostatically, and to this end it is shown as secured in any suitable way to a rod 30 which passes through the opening 24 in the bottom wall of the cup-shaped member 23 and through a packing gland 31 of any suitable construction carried by a tubular extension 32 formed on or secured to the cover plate 33 of the valve housing 10, here shown as secured to said valve housing by bolts or screws 34 passing through flanges 35 on the valve housing and cover plate, with interposed packing 36 as desired. At its outer end rod 30 has formed thereon or suitably secured thereto a head 37 in contact with or secured to the movable end wall 38 of an expansible and collapsible chamber 48 whose inner periphery is defined by an expansible and collapsible corrugated tubular wall or bellows 39 that has a flange 40 at its opposite end by which it is clamped between flanges 41 formed on a supporting bracket 42 and a cup-shaped wall 43 which forms the outer wall of said chamber.

Bracket 42 may be mounted on or secured to the cover plate 33 in any suitable way and has formed thereon or suitably secured thereto webs 44 which carry, in guiding relationship to the rod 30, a tube 45 that is exteriorly threaded. Rotatably mounted on the threads of said tube 45 is an abutment plate 46 between which and the head 37 is disposed a coil spring 47. Spring 47 reacts between the plate 46 and the head 37 to normally urge the rod 30 in an upward direction as viewed in the drawing, and as bracket 42 is made of open construction so as to provide ready access to the abutment plate 46 the latter may be rotated on the threaded tube 45 to vary the tension of said spring 47 and therefore the resilient force opposing the expansion of the thermostat which includes the chamber 48.

Said expansible and collapsible chamber 48 has in communication therewith a tube 49, of any suitable length, size and construction, extending to a bulb 50, of any suitable construction, which may be disposed at any desired location with respect to said chamber 48. Bulb 50, tube 49 and chamber 48 are charged with any suitable thermosensitive fluid, and bulb 50 is subjected to the temperature to be controlled so that variations of temperature at the bulb 50 produce variations of pressure in the chamber 48 and thereby actuation of the rod 30 connected to the abutment plate 26.

It is a recognized physical principle that flow of fluid through an orifice of predetermined area remains constant as long as a constant differential of pressure is maintained between the pressures at the inlet and outlet sides of said orifice. As before noted, the clearance 22 between the periphery of the disk 21 and the inner face of the wall of the housing 10 constitutes an orifice of predetermined area. As the fluid under pressure entering through the inlet 11 has free access to the interior of the cup-shaped wall 23 through the aperture 24, the total pressure on the face 51 of said disk 21 is equal to the area of said face 51 multiplied by the inlet pressure. The opposite face 52 of said disk, which is of substantially the same area as said face 51, is subjected to the pressure of the fluid after flowing through said orifice 22, and therefore the total pressure on said face 52 is equal to the area of said face multiplied tby the pressure of the fluid after passing through the orifice 22. For any given temperature the abutment plate 26 may be looked upon as a fixed abutment plate, and as the tension of the spring 27 is applied upwardly as viewed in the drawing to the cup-shaped member 23 attached to the disk 21, a balanced condition exists when the total pressure on the face 51 minus the tension of the spring 27 is equal to the total pressure on the face 52. Expressed otherwise, the difference between the total pressures on the faces 51 and 52 of disk 21 is equal to the tension of the spring 27, and as said tension is a constant value there is therefore a constant differential in pressure between the pressures at the inlet and outlet sides of the orifice 22 as soon as a balanced pressure relationship is established. Under these conditions, in conformity with the physical principle above referred to, a constant flow of fluid is maintained.

It will be noted that, as illustrated, the disk 21 and the valve mechanism 16, 17 associated therewith are suspended by the cup-shaped member 23 on the spring 25 so that the constant tension on said spring is equal to the weight of the parts suspended on said spring.

If there is an increase in the inlet pressure the total pressure on the face 51 of the disk 21 is correspondingly increased whereby said disk 21 is moved downwardly as viewed in the drawing to move the valve members 16 and 17 toward their ports and thereby decrease the flow of fluid through the ports 14 and 15, increasing the back pressure on the face 52 of the disk 21 until the difference in total pressures on the faces 51 and 52 is again equal to the tension of the spring 27. A decrease in the inlet pressure will produce an upward motion of the disk 21 as viewed in the drawing, moving the valve members 16 and 17 away from the ports 14 and 15 and thereby decreasing the back pressure on the face 52 until the difference in the total pressures on faces 51 and 52 is again equal to the tension of the spring 27. Similarly, if there is an increase in the back pressure in the outlet conduit 12, there is a corresponding increase in the pressure on the face 52, causing the disk 21 to move upwardly, moving the valve members 16 and 17 away from their ports 14 and 15 to relieve the back pressure on the face 52, until the difference in total pressures on said faces 51 and 52 is equal to the tension of the spring 27. If there is a decrease in the back pressure acting on the face 52, disk 21 is moved downwardly as viewed in the drawing, moving the valve members 16 and 17 toward their ports 14 and 15 to increase the back pressure on face 52 until the difference in total pressures on the faces 51 and 52 is again equal to the tension of the spring 27.

It will therefore be perceived that irrespective of any fluctuations in either the inlet pressure or the outlet pressure or both the disk 21 responds to any variation in the total pressures on its opposite faces to adjust the valve members 16 and 17 until the difference in total pressures on said faces 51 and 52 is restored to equality with the tension of the spring 27. Consequently, a constant differential of pressure is maintained between the pressures at the inlet and outlet sides of the orifice 22 whereby a constant flow of fluid is maintained irrespective of any fluctuations in either the inlet or the outlet pressure.

When, as preferred, the abutment plate 26 is thermostatically adjustable, any increase of temperature at the bulb 50 results in an increase of pressure in the chamber 48, and when said pressure in chamber 48 becomes great enough to overcome the tension of the spring 47, as preliminarily set by the adjustment of the abutment plate 26, rod 30 is moved downwardly as viewed in the drawing to move the abutment plate 26 and the parts associated therewith and therefore the valve members 16 and 17 so as to diminish the flow through the ports 14 and 15. Conversely, on a drop in temperature at the bulb 50 there is a decrease of pressure within the chamber 49 whereupon spring 47 moves head 37 upwardly as viewed in the drawing to thereby move the rod 29, the abutment plate 26 and the parts associated therewith and therefore the valve members 16 and 17 so as to increase the flow of fluid through said ports. Once the abutment plate 26 has been repositioned by the thermostat in conformity with the demands of the temperature at the bulb 56, the abutment plate 26 again acts as a fixed abutment plate, and the constant flow valve operates in the manner heretofore described to maintain a constant flow by equating the difference in total pressures on the faces 51 and 52 of the disk 21 to the tension of spring 27, i. e. by maintaining a fixed pressure drop across the orifice 22, but the total volume of flow is increased or decreased depending upon whether the valve members are moved away from or toward their respective ports.

It will therefore be perceived that the present invention provides a constant flow valve which maintains a predetermined rate of flow under variations in the outlet pressure as well as variations in the inlet pressure. The present invention also provides a thermostatically operated constant flow valve which enables the total volume of flow to be thermostatically controlled but the constant flow of fluid is maintained in all positions of thermostatic adjustment irrespective of fluctuations in the inlet pressure or the outlet pressure or both. The device is particularly simple in construction so that it is easy to fabricate and assemble, and yet it is highly efficient in operation.

While the embodiment of the invention illustrated on the drawing has been described with considerable particularity, it is to be expressly understood that the invention is not limited thereto, as the same is capable of receiving a variety of mechanical expressions, some of which will now readily suggest themselves to those skilled in the art, while changes may be made in the details of construction, size, arrangement, proportion, etc., and parts shown may be replaced by equivalent parts, without departing from the spirit of this invention. Reference is therefore to be had to the appended claims for a definition of the invention.

What is claimed is:

1. In a constant flow valve, in combination with a valve housing having inlet and outlet connections, a ported partition in said housing providing inlet and outlet chambers respectively in communication with said inlet and outlet connections, and valve mechanism for controlling fluid flow through said ported partition, a movable plate member in said inlet chamber providing an orifice of predetermined area between its periphery and the walls of said inlet chamber and operatively connected to said valve mechanism, a cup-shaped housing secured to said plate member, means providing a movable abutment plate within said housing, and resilient means interposed between said abutment plate and the wall of said housing for applying a predetermined resilient force to said plate member in opposition to the action of the inlet pressure on the face of said member at the inlet side of said orifice.

2. In a constant flow valve, in combination with a valve housing having inlet and outlet connections, a ported partition in said housing providing inlet and outlet chambers respectively in communication with said inlet and outlet connections, and valve mechanism for controlling fluid flow through said ported partition, a movable plate member in said inlet chamber providing an orifice of predetermined area between its periphery and the walls of said inlet chamber and operatively connected to said valve mechanism, means associated with said plate member and providing a spring seat, an abutment plate disposed in opposition to said spring seat, resilient means interposed between said abutment plate and said spring seat for applying a predetermined resilient force to said plate member in opposition to the action of the inlet pressure on the face of said plate member at the inlet side of said orifice, and means for adjusting the position of said abutment plate to vary the position of said plate member and associated valve mechanism including a thermostat and means connected to said abutment plate and operatively associated with said thermostat for varying the position of said abutment plate in conformity with variations of temperature at said thermostat.

3. In a constant flow valve, in combination with a valve housing having inlet and outlet connections, a ported partition in said housing providing inlet and outlet chambers respectively in communication with said inlet and outlet connections, and valve mechanism for controlling fluid flow through said ported partition, a movable plate member in said inlet chamber providing an orifice of predetermined area between its periphery and the walls of said inlet chamber and operatively connected to said valve mechanism, means associated with said plate member and providing a spring seat, an abutment plate in opposition to said spring seat, resilient means interposed between said abutment plate and said spring seat for applying a predetermined resilient force to said plate member in opposition to the action of the inlet pressure thereon, and a thermostat operatively connected to said abutment plate for moving the same and said plate member and associated valve mechanism for varying the rate of fluid flow through said ported partition.

4. In a constant flow valve, in combination with a valve housing having inlet and outlet connections, a ported partition in said housing providing inlet and outlet chambers respectively in communication with said inlet and outlet connections, and valve mechanism for controlling fluid flow through said ported partition, a movable plate member in said inlet chamber providing an orifice of predetermined area between its periphery and the walls of said chamber and operatively connected to said valve mechanism, and means for supporting said member in said inlet chamber comprising a movable abutment plate, a spring mounted on said abutment plate and means suspending said member on said spring whereby said spring opposes the weight of said member, of said suspending means and of said valve mechanism and the inlet pressure on the inlet side of said plate member, and means for adjusting the position of said abutment plate and the parts suspended thereon to vary the relationship of said valve mechanism with respect to said ported partition.

5. In a constant flow valve, in combination with a valve housing having inlet and outlet connections, a ported partition in said housing providing inlet and outlet chambers respectively in communication with said inlet and outlet connections, and valve mechanism for controlling fluid flow through said ported partition, a plate member in said inlet chamber providing an orifice of predetermined area between its periphery and the walls of said inlet chamber and operatively connected to said valve mechanism, and means for supporting said member in said inlet chamber comprising an abutment plate, a spring mounted on said abutment plate and means suspending said member on said spring whereby said spring opposes the weight of said member, of said suspending means and of said valve mechanism and the inlet pressure on the inlet side of said member, a rod upon which said abutment plate is mounted, and a thermostat operatively connected to said rod for adjusting the position of said abutment plate and the parts suspended thereon.

CHARLES D. BRANSON.

REFERENCES CITED

The following references are of record in the file of this patent:

UNITED STATES PATENTS

| Number | Name | Date |
|---|---|---|
| 257,069 | Reznor | Apr. 25, 1882 |
| 1,933,852 | Hahn | Nov. 7, 1933 |
| 1,988,776 | Berghoefer | Jan. 22, 1935 |
| 2,079,579 | Shrode | May 4, 1937 |
| 2,290,838 | White | July 21, 1942 |
| 2,321,573 | Chace | June 15, 1943 |
| 2,472,787 | Brown et al. | June 14, 1949 |
| 2,498,194 | Arthur | Feb. 21, 1950 |